United States Patent [19]

Featherstone et al.

[11] Patent Number: 4,874,529

[45] Date of Patent: * Oct. 17, 1989

[54] PROCESS AND APPARATUS FOR REDUCING THE CONCENTRATION OF SUSPENDED SOLIDS IN CLARIFIED GEOTHERMAL BRINE

[75] Inventors: John L. Featherstone; S. Timothy Spang, both of El Centro; David G. Newell, Palm Desert; Darrell L. Gallup, Chino, all of Calif.

[73] Assignee: Union Oil Company of California, Los Angeles, Calif.

[ * ] Notice: The portion of the term of this patent subsequent to Mar. 1, 2005 has been disclaimed.

[21] Appl. No.: 162,005

[22] Filed: Feb. 29, 1988

Related U.S. Application Data

[63] Continuation-in-part of Ser. No. 814,099, Dec. 27, 1985, Pat. No. 4,728,438.

[51] Int. Cl.⁴ .............................................. C02F 1/56
[52] U.S. Cl. .................................... 210/713; 60/641.5; 210/734; 210/747; 210/195.3; 210/208
[58] Field of Search ............................. 60/641.2, 641.5; 210/713, 714, 723, 726, 727, 728, 734, 747, 170, 195.1, 195.3, 205, 207, 208

[56] References Cited

U.S. PATENT DOCUMENTS

| | | | |
|---|---|---|---|
| 2,668,144 | 2/1954 | Joos | 210/713 |
| 3,479,282 | 11/1969 | Chamot et al. | 210/734 |
| 3,520,802 | 7/1970 | Pavia | 210/713 |
| 3,523,889 | 8/1970 | Eis | 210/715 |
| 3,680,698 | 9/1972 | Liu et al. | 210/710 |
| 3,728,253 | 4/1973 | Kaufman | 210/624 |
| 4,055,494 | 10/1977 | Emmett, Jr. | 210/715 |
| 4,302,328 | 11/1981 | van Note | 210/714 |
| 4,304,666 | 12/1981 | van Note | 210/197 |
| 4,309,291 | 1/1982 | Probstein et al. | 210/713 |
| 4,370,858 | 2/1983 | Awerbuch et al. | 210/747 |
| 4,428,200 | 1/1984 | McCabe et al. | 165/45 |
| 4,429,535 | 2/1984 | Featherstone et al. | 60/641.5 |
| 4,536,294 | 8/1985 | Guillet et al. | 210/734 |
| 4,588,508 | 5/1986 | Allenson et al. | 210/734 |
| 4,728,438 | 3/1988 | Featherstone et al. | 210/713 |
| 4,763,479 | 8/1988 | Hoyer et al. | 210/747 |
| 4,765,912 | 8/1988 | Totten | 210/713 |

OTHER PUBLICATIONS

Seesee et al., "Process Design of Niland Geothermal Energy Program", presented at the 1985 International Symposium on Geothermal Energy, Aug. 1985, Hawaii, pp. 183–187.
"A Cost-Effective Treatment System for the Stabilization of Spent Geothermal Brines", Featherstone et al. (publication date unknown).
"Stabilization of Highly Saline Geothermal Brines", Featherstone et al., SPE Report No. 8269 (undated).

*Primary Examiner*—Peter Hruskoci
*Attorney, Agent, or Firm*—Walter A. Hackler

[57] ABSTRACT

A process and apparatus is provided for reducing the concentration of fine, residual solids still remaining suspended in clarified geothermal brine overflow from a primary brine clarification stage in which hot, flashed, silica-rich geothermal brine, containing suspended siliceous material, is gravity separated, comprises flowing the brine overflow from the primary clarification stage into a closed secondary clarifier vessel having an internal reaction well. Capacity of the secondary clarifier vessel provides a brine residence time in the vessel of between about 45 and about 150 minutes, the brine residence time in the reaction well being between about 10 and about 20 minutes. Brine in the vessel is blanketed with steam flashed from the brine to exclude air from the vessel. In the reaction well, the brine is contacted with a flocculating agent, such as a cationic, anionic, or non-ionic polyacrylamide having a molecular weight of at least about 1 million, in an amount of between about 0.25 and about 2 parts per million. An underflow slurry of flocculated siliceous solids and brine is discharged from the bottom of the vessel. An amount of such underflow slurry is recirculated back into the reaction well to cause the solids concentration in the well to be between about 0.5 and about 3 weight percent. A secondarily clarified brine overflow from the secondary clarifier vessel has a concentration of fine, siliceous material remaining suspended therein that is substantially reduced over the concentration of such material suspended in the brine overflow from the primary clarification stage.

29 Claims, 7 Drawing Sheets

PROCESS AND APPARATUS FOR REDUCING THE CONCENTRATION OF SUSPENDED SOLIDS IN CLARIFIED GEOTHERMAL BRINE

This application is a continuation-in-part of application Ser. No. 814,099, filed Dec. 27, 1985 now U.S. Pat. No. 4,728,438.

BACKGROUND OF THE INVENTION

1. Field of the Invention

The present invention relates generally to the production of steam from geothermal brine and especially to processes and apparatus for clarifying flashed, silica-rich geothermal brine before the reinjection thereof into the ground.

2. Discussion of the Prior Art

Large subterranean aquifers of naturally produced (geothermal) steam or hot aqueous liquids, specifically water or brine, are found throughout the world. These aquifers, which often have vast amounts of thermal energy, are most commonly found where the earth's near-surface thermal gradient is abnormally high, as evidenced by unusually great volcanic, fumarole and/or geyser activity. Thus, as an example, geothermal aquifers are fairly common along the rim of the Pacific Ocean, long known for its volcanic activity.

Geothermal steam or water has, in some regions of the world, been used for centuries for therapeutic treatment of physical infirmities and diseases. In other regions, such geothermal fluids have long been used to heat dwellings and in industrial processes. Although efforts to further develop geothermal resources for these site-restrictive uses continue, considerable recent research and development has additionally been directed to the exploitation of geothermal resources for production of electrical power, which can be conducted, often over existing power grids, for long distances from the geothermal sources. In particular, recent steep increases in the cost of petroleum products used for the conventional production of electric power, as well as actual or threatened petroleum fuel shortages and/or embargoes, have intensified the interest in use of geothermal fluids as an alternative, and generally self-renewing, source of power plant "fuel."

General processes by which geothermal fluids can be used to generate electric power are known, and have been known for some time. As an example, geothermal steam, after removal of particulate matter and such polluting gases as hydrogen sulfide and ammonia, can be used in the manner of boiler-generated steam to operate steam turbine generators.

Naturally pressurized geothermal brine or water having a temperature of over about 400° F. can be flashed to a reduced pressure to convert some of the brine or water to steam. The steam produced in this manner can then be used to drive steam turbine generators. The flashed geothermal liquid and the steam condensate obtained from power generation are typically reinjected into the ground to replenish the aquifer and prevent ground subsidence. Cooler geothermal brine or water can often be used to advantage in binary systems in which a low-boiling point, secondary liquid in a closed loop is vaporized by the hot geothermal liquid, the vapor produced from the secondary liquid being used to operate gas turbine generators. The "used" brine is then typically reinjected into the ground for reasons mentioned above.

As might be expected, the use of geothermal steam is preferred over the use of geothermal water or brine for generating electric power, because the steam can be used more directly, easily and cheaply. Consequently, where readily and abundantly available, geothermal steam has been used for a number of years to generate commercially important amounts of electric power at favorable costs. For example, by the late 1970's, geothermal steam at The Geysers in Northern California was generating about two percent of all the electricity used in California.

Although energy production facilities at such important geothermal steam sources as The Geysers are generally still being expanded, the known number of important geothermal steam aquifers is small compared to that of geothermal brine or water. Current estimates are, in fact, that good geothermal brine or water sources are about five times more prevalent than are good sources of geothermal steam. The potential for generating electric power is, therefore, much greater for geothermal brine and water then it is for geothermal steam. As a result, considerable current geothermal research is understandably directed toward developing economical geothermal brine and water electric power generating plants, much of this effort being expended toward the use of vast geothermal brine resources in the Imperial Valley of Southern California.

Although, as above mentioned, general processes are known for using geothermal brine or water for producing electric power, serious problems—especially with the use of highly saline and corrosive geothermal brines—have often been encountered in actual practice. These problems have frequently been so great as to prevent the production of electric power at competitive rates and, as a consequence, have greatly impeded the progress of flashed geothermal brine power plant development in many areas.

These severe brine-handling problems are caused primarily by the typically complex chemical and corrosive nature of most geothermal brines. At natural aquifer temperatures in excess of about 400° F. and pressures in the typical range of about 400 psig to about 500 psig, geothermal brines leach large amounts of salts, minerals and elements from the aquifer formation, the brines presumably being in chemical equilibrium with their producing formations. Thus, although brine composition may vary considerably from aquifer to aquifer, or even from well to well, the brines typically contain very high levels of dissolved silica, as well as substantial levels of dissolved heavy metals such as lead, copper, zinc, iron, and cadmium. In addition, many other impurities, particulate matter and dissolved gases are contained in most geothermal brines.

As natural brine pressure and temperature are substantially reduced in power plant steam production (flashing) stages, chemical equilibrium of a brine is disturbed and saturation levels of silica and other materials dissolved in the brine are commonly exceeded. This causes silica and these other materials to precipitate from the brine, as a tough, tenacious scale, onto brine-exposed equipment walls and in reinjection wells, often at a deposition rate as high as several inches a month. Assuming, as is common, that the brine is supersaturated with silica at the wellhead, in high temperature portions of the brine handling system (for example, in the high pressure brine flashing vessels) heavy metal sulfide and silicate scaling typically predominate. In lower temperature portions of the system (for example, in atmospheric flashing vessels) amorphous silica and hydrated ferric oxide scaling have been found to predominate. Scale, so formed, typically comprises iron-rich silicates, and is usually very difficult, costly and time consuming to remove from equipment. Because of the fast-growing scale rates, extensive facility downtime for descaling operations is usually required unless scale inhibiting processes are employed. Associated injection wells may also require frequent and extensive rework due to scale formation, and new injection wells may, from time to time, have to be drilled at great cost.

Therefore, considerable effort has been, and is being, directed toward developing effective processes for eliminating, or at least very substantially reducing, the formation of scale in flashed geothermal brine handling systems. One such scale-inhibiting process disclosed in U.S. Pat. No. 4,370,858 to Awerbuck, et al, involves the induced precipitation of scale-forming materials, notably silica, from the brine in the flashing stage by contacting the flashed brine with large amounts of fine silica or silica-rich seed crystals. When the amount of silica which can remain in the brine is exceeded by the brine being flashed to a reduced pressure, silica leaving solution in the brine deposits onto the seed crystals which are subsequently removed from the system. Not only do the vast number of micron-sized seed crystals introduced into the flashing stage provide a very much larger surface area for silica deposition than the exposed surfaces of the flashing vessels but also the silica from the brine tends to preferentially deposit onto the seed crystals for chemical reasons, not all of which are completely understood. As a result, with the use of such processes, most of the silica leaving the brine precipitates onto the seed crystals, instead of precipitating as scale onto vessel and equipment walls and in injection wells.

Preferably, the seed crystals used for such processes are introduced into the high pressure flashing vessel (crystallizer), wherein steam is separated from the two-phase geothermal fluid. The silica removal or crystallization process, although commencing in the high pressure flash crystallizer, continues in successive, lower-pressure flashing vessels, in which additional steam separation occurs. In a downstream reactor-clarifier, the suspended siliceous material is subsequently separated from the brine as a slurry which may contain about 30 percent by weight of silica. According to known seeding processes, a portion of this siliceous slurry from the reactor-clarifier stage may advantageously be recirculated back upstream into the high pressure flash crystallizer, wherein the silica material in the slurry acts comprises the silica seed material.

For such reasons as aquifer replenishment and avoiding ground subsidence, the brine overflow from the reactor-clarifier, as well as steam condensate from the electric power generating facility, is usually pumped back into the ground through deep injection wells. Although a properly designed reactor-clarifier is ordinarily effective for removing most of the siliceous solids suspended in the brine, the overflow brine from the flash crystallization stage typically still contains many suspended particles which are too fine to settle out in the reactor-clarifier in a reasonable length of time. The concentration of these fine particles in the brine overflow from the reactor-clarifier is frequently sufficient to cause plugging of the injection wells at an excessive rate. Therefore, absent further treatment of the clarified brine, costly injection well rework and/or the costly drilling of new injection wells may be so frequently required that electric power production by the brine becomes uneconomical.

Normally, therefore, a clarified brine filtration stage is provided between the reactor-clarifier and the injection wells to protect the wells. When properly functioning, the brine filtration stage, which typically comprises several dual-media filters, reduces the residual suspended solids concentration in the brine to acceptable injection levels. It should, however, be appreciated that tradeoffs generally exist between the cost of increasing filter effectiveness and the cost of occasional injection well rework.

By way of illustrative example, the clarified brine overflow from a typical reactor-clarifier may, in some instances, have a residual suspended solids concentration of about 150 parts per million, with a mean particle size of between about 4 and about 5 microns. However, by effectively filtering the clarified brine, the residual suspended solids concentration may be reduced to only about 10 to 15 parts per million, with a mean particle size of between about 3 and about 4 microns. Such solids concentrations after brine filtering appear not to cause an excessive amount of damage to brine injection wells and are generally considered acceptable.

Although it is generally possible, by effective brine filtration, to achieve an acceptably reduced suspended solids concentration in clarified brine, the filtering process has itself typically been found to create new and serious problems in geothermal brine handling systems. For the filters to be effective in filtering the brine, they must, of course, remove a substantial amount of the residual, suspended solids from the brine. These removed solids necessarily accumulate in the filters and must periodically be removed in order to maintain filter effectiveness and efficiency. However, the fine siliceous particles removed by the filters from the clarified brine tend to be very "sticky" or cohesive in nature and, as a result, tend rapidly to agglomerate into sizeable clumps of material commonly referred to as "mud balls." These mud balls, which rapidly become larger and more massive than the filter media particles, cannot be easily removed from the filters by conventional backwash procedures, and even with frequent filter backwashing mud balls often still form at rates requiring the costly replacement of the filter media as frequently as every few months. Available media filters suitable for such brine filtering have, moreover, generally been found to be difficult and time consuming to repack with filter media.

Frequent filter backwashing to retard mud ball formation in the filters, and thereby prolong filter media life, has been found to cause other problems. For example, to avoid the necessity for power plant shutdown during filter backwashing, which may be required as often as every few hours in some facilities, otherwise-redundant filters must generally be provided at substantial added facility cost.

Moreover, frequent filter backwashing increases backwash disposal problems. Ordinarily the filters are backwashed, from a backwash holding tank, with filtered brine from the filters. Like the brine itself, the backwash brine must generally be reinjected into the ground as the only practical method of disposal, particularly since the material backwashed from the filters may contain potentially hazardous concentrations of such heavy metals as lead and zinc. However, because of the amount of solids swept out of the filters by the backwash brine, direct injection of the backwash brine through the brine injection wells is usually not practical. It has, therefore, been the usual practice to pond the backwash brine for a period of time during which some of the contained solids settle from the brine, and them to pump the brine, still containing some suspended solids, back upstream, for example, into the atmospheric flash vessel for recombination with the main flow of brine upstream of the reactor-clarifier stage. However, the solids suspended in the backwash-brine tend to upset the brine-solids separation process in the reactor-clarifier, thereby causing the clarified brine overflow from the reactor-clarifier to have higher than normal concentrations of suspended solids. This, in turn, overloads the filters, and accelerates the formation of mud balls in the filters, and necessitates even more frequent backwashing. Furthermore, the ponding of the backwash brine before the combining thereof with the main flow of brine causes the backwash to become more acidic, due principally to the air oxidation of ferrous ions (naturally present in the brine) to ferric ions. As a result, the corrosion of downstream brine-handling equipment is typically increased when backwash brine is ponded before injection.

These and other filtering stage problems have added significantly to the overall cost of power production from geothermal brine, and have been instrumental, along with other brine-handling problems, in making the economical production of electric power by the use of geothermal brine difficult to achieve. Consequently, improved processes for the pre-injection treatment of clarified brine are still needed.

It is, therefore, an object of the present invention to provide a process and apparatus for the secondary clarification of geothermal brine prior to the reinjection thereof into the ground.

Another object of the present invention is to provide a geothermal brine secondary clarification process and apparatus utilizing flocculants and the recirculation of brine underflow from the secondary clarification process.

Other objects, advantages and features of the present invention will become apparent to those skilled in the art from the following description, when taken in conjunction with the accompanying drawings.

SUMMARY OF THE INVENTION

According to the present invention, there is provided a process and apparatus for reducing the concentration of residual solids suspended in geothermal brine overflow from a primary brine clarification stage, in which a suspended siliceous material is separated from hot, flashed silica-rich geothermal brine, the geothermal brine overflow however still having a residual amount of solids remaining suspended therein. The process comprises flowing the geothermal brine overflow from the primary brine clarification stage into a secondary clarifier vessel and contacting the brine overflow from the primary brine clarification stage in the secondary clarifier vessel with a flocculating agent. The flocculating agent is preferably selected from the group consisting of an anionic polyacrylamide, a cationic polyacrylamide, a non-ionic polyacrylamide, and mixtures thereof. Also preferably, the selected flocculating agent has a molecular weight of at least about 1 million, and, more preferably, at least about 16 million.

Preferably included in the process are the steps of (i) discharging from the secondary clarifier vessel an underflow of flocculated solids and brine, (ii) recirculating a portion of the flocculated solids in a reaction well region of the secondary clarifier so as to provide an increased solids concentration in the reaction well region, and (iii) discharging from the secondary clarifier vessel a secondarily-clarified brine overflow in which the concentration of residual suspended solids is substantially reduced over the concentration of residual solids suspended in the brine overflow from the primary clarification stage. Preferably, the flocculated solids are recirculated so that the solids concentration in the reaction well of the secondary clarifier is between about 0.5 and about 3 weight percent, with a solids concentration of about 1.5 weight percent being even more preferred.

The secondary clarifier vessel preferable has closed upper regions, in which case the process may then include the steps of blanketing the geothermal brine in the vessel with steam, to exclude air therefrom. Oxidation of ferrous ions naturally contained in the brine is thereby prevented while the brine is in the vessel. In one embodiment, the brine in the secondary clarifier vessel is blanketed with steam obtained from the upstream flashing of the brine, thereby assuring the chemical compatibility of the steam with the brine.

According to the preferred embodiment, the secondary clarification vessel is sized to provide a geothermal brine residence time therein of at least about 45 minutes, and preferably between about 45 and about 150 minutes. Also, in the preferred embodiment, the process step of contacting the geothermal brine overflow from the primary brine clarification stage with a flocculating agent includes adding an amount of flocculating agent to the brine of between about 0.25 and about 2 parts per million, and more preferably between about 0.75 and about 1.25 parts per million. Moreover, it is preferred that the flocculating agent be added to the brine overflow from the primary brine clarification stage before the brine overflow is introduced into the secondary clarification vessel.

In one instance, the concentration of siliceous solids or particles remaining suspended in the brine overflow from the primary brine clarification stage is between about 100 and about 300 parts per million; whereas, the concentration of such particles in the secondary clarifier vessel is between about 20 and about 50 parts per million.

An apparatus for performing the process is correspondingly provided.

BRIEF DESCRIPTION OF THE DRAWINGS

The present invention will be more readily understood by reference to the drawings in which.

DESCRIPTION OF THE PREFERRED EMBODIMENT

The present, secondary brine clarification process for the pre-injection treatment of clarified geothermal brine can best be understood by first considering an exemplary, preexisting-type of geothermal brine electrical power plant which incorporates a conventional, pre-injection brine filtering stage. There is then described another exemplary geothermal brine electrical power plant which utilizes, in place of the brine filtering stage, a secondary brine clarification stage in accordance with the present invention.

Figure 1A:
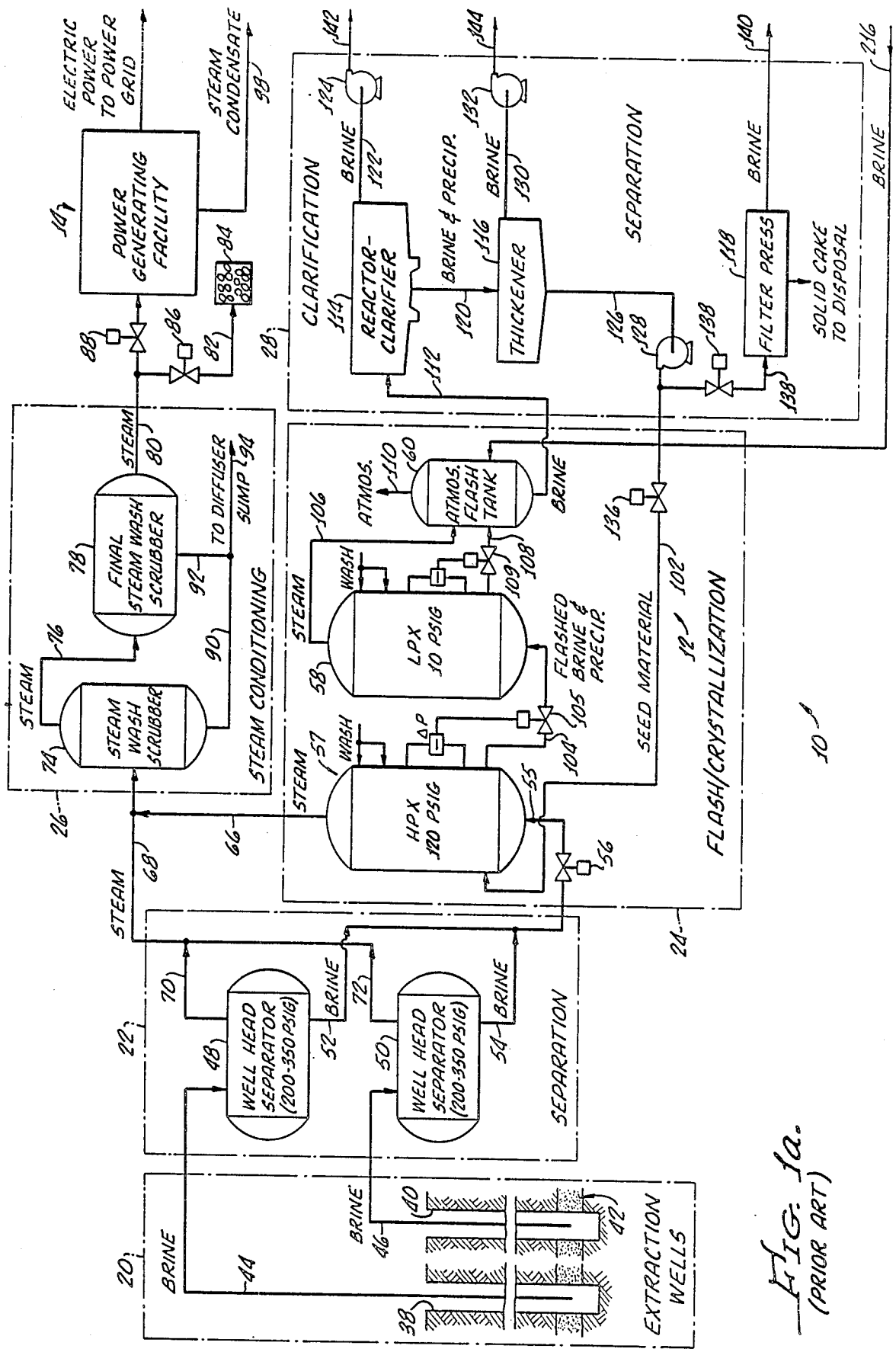
FIG. 1 is a simplified diagram of an exemplary, known-type of geothermal brine electrical power plant incorporating a conventional, pre-injection brine filtering stage, FIG. 1a showing one part of the power plant and FIG. 1b showing the remainder of the power plant.
Figure 1B:
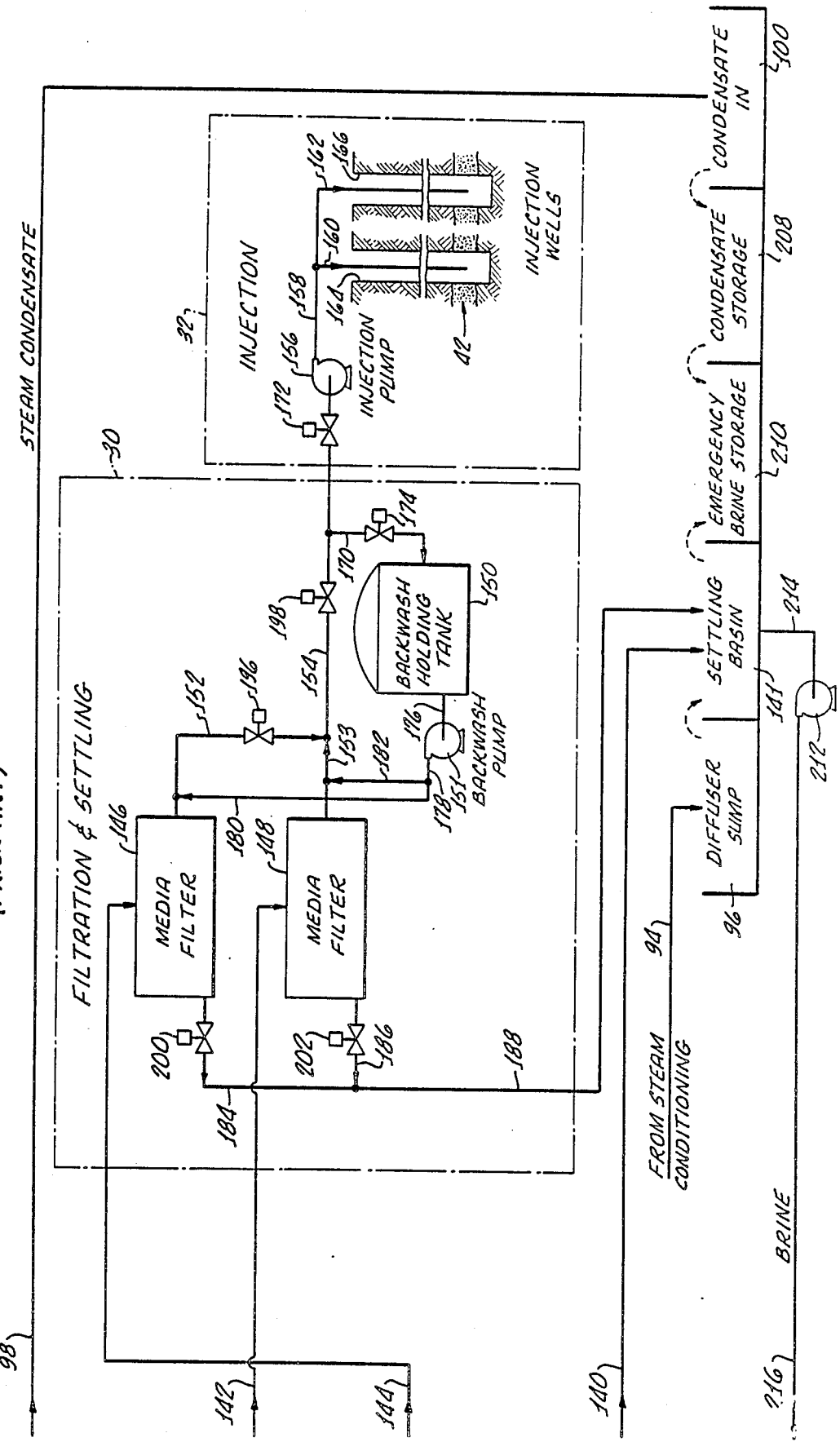

Shown, therefore, in simplified form in FIGS. 1a and 1b is an exemplary, conventional geothermal power plant 10, which comprises a brine handling portion 12 and an associated electric generating portion 14. The function of brine handling portion 12 is the extraction of hot, pressurized, geothermal brine from an underground aquifer; the conversion, by a brine flashing process, of some of the brine into steam; and the injection back into the underground aquifer of the flashed brine and of steam condensate (if any) returned from power generating portion 14. In turn, power generating portion 14 uses the steam provided by brine handling portion 12 for the production of electric power, for example, by using the steam to drive a steam turbine generator (not shown).

Generally comprising brine handling portion 12 are brine extraction stage 20 (FIG. 1a), a wellhead separation stage 22, a steam production (flashing) and silica crystallization stage 24, a steam conditioning stage 26, a brine clarification stage 28, a brine filtering stage 30 (FIG. 1b ), and a brine injection stage 32. As more particularly described below, brine filtering stage 30 is replaced by a secondary clarification stage in the present invention.

More specifically, brine extracting stage 20, as shown in FIG. 1a, includes first and second geothermal brine extraction wells 38 and 40, by means of which geothermal brine is extracted from a common underground aquifer 42. At the wellhead, the geothermal brine ordinarily contains both liquid and vapor phases and may have a temperature of between about 400° F. and about 600° F. and may be at a natural pressure of between about 250 psig and about 500 psig. Typically, the wellhead temperature and pressure are, respectively, about 450° F. and about 450 psig. At formation temperature and pressure, which are even higher than wellhead temperature and pressure, the geothermal brine dissolves substantial amounts of minerals and elements from aquifer formation 42. Geothermal brines thus normally contain some steam and substantial amounts of dissolved salts (hence, the term "brine"), and are typically saturated with silica. Moreover, geothermal brines may, in many locations, contain appreciable dissolved amounts of such elements as lead, zinc, copper, iron, cadmium, silver, manganese, arsenic, and antimony. Non-condensible gases, including hydrogen sulfide, ammonia, and carbon dioxide, are usually intermixed with the brine. Geothermal brines thus ordinarily comprise heavily "contaminated" water and typically have wellhead pHs of between about 5 and 5.5.

From wells 38 and 40, the brine and steam are flowed (through conduits 44 and 46) to respective first and second wellhead separators 48 and 50 which comprise separator stage 22 (FIG. 1a). In wellhead separators 48 and 50, steam and the non-condensible gases are separated from the brine. The brine is flowed from wellhead separators 48 and 50 (in sequence through respective conduits 52 and 54, a common conduit 55, and a flashing valve 56) into the bottom of a high pressure flash crystallizer (HPX) 57. Together, high pressure flash crystallizer 57, a low pressure flash crystallizer (LPX) 58, and an atmospheric flash vessel 60, principally comprise steam production (flashing) and silica crystallization stage 24. Across flashing valve 56, the brine is flashed to a reduced pressure of, for example, about 120 psig, part of the brine being thereby converted into steam. Within high pressure flash crystallizer 57, the steam is separated from the brine. As an illustration, for an extraction rate of about 1.3 million pounds per hour of about 450° F. and 450 psig brine, there may be produced about 95,000 pounds per hour of 120 psig steam may be provided from high pressure flash crystallizer 57. This steam is flowed from high pressure flash crystallizer 57, though a conduit 66, into a common steam discharge conduit 68 which also receives steam, through respective conduits 70 and 72, from wellhead separators 48 and 50. Conduit 68 discharges the steam into a first steam scrubber 74, from which partially-cleaned steam is discharged, through a conduit 76, to a second (final) steam scrubber 78. Clean steam is discharged from second scrubber 78, through a conduit 80, to power generating portion 14.

In the event the quality of steam discharged through conduit 80 from second scrubber 78 does not meet power generation requirements, for example, as to the level of total dissolved solids (TDS), the steam may be vented from conduit 80, through a conduit 82, to an atmospheric vent apparatus 84—for example, a rock-filled pit. Valves 86 and 88, in respective conduits 80 and 82, control the flow of steam from scrubber 78 to power generating facility 14 or to vent apparatus 84, as the case may be. The mixture of wash water and steam condensate from scrubbers 74 and 78 is discharged, through conduits 90 and 92 and a common conduit 94, to a diffuser sump 96 (FIG. 1b ). Steam condensate is returned from power generating portion 14, through a conduit 98 to a "condensate in" vessel 100 in steam generating portion 12 (FIG. 1b) for subsequent disposal, as described below.

Siliceous seed material is fed upstream, also as described below, from brine clarification stage 28, through a conduit 102, into high pressure flash crystallizer 57 (FIG. 1a). Within high pressure flash crystallizer 57, silica from the brine, which is typically supersaturated in silica as a result of the reduction in brine temperature and pressure, preferentially deposits or crystallizes (with other impurities) from the brine onto the seed material as a siliceous deposit. The brine and seed material are preferably circulated through crystallizer 57 to enhance the silica cryatallization process.

From high pressure flash crystallizer 57, the brine and the siliceous material suspended therein are flowed, through a conduit 104 and a flashing valve 105, into the bottom of low pressure flash crystallizer 58 (FIG. 1a). Across flashing valve 105, the brine is flashed to a further reduced pressure, for example, about 10 psig, to flash more of the brine into steam, the mixture of brine and steam being fed into low pressure flash crystallizer 58 for separation. For the exemplary brine extraction rate mentioned above, the amount of steam separated from the brine in low pressure flash crystallizer 58 may also be about 95,000 pounds per hour. Such additional steam, which has relatively low energy content, is discharged from low pressure crystallizer 58, through a conduit 106, into atmospheric flash vessel 60. Within low pressure flash crystallizer 58, additional silica may be deposited from the brine onto the silica particles entrained in the brine.

Brine and the silicious material suspended therein are discharged from low pressure crystallizer 58, through conduit 108. Across a third flashing valve 109 in conduit 108, the brine is flashed to atmospheric pressure so as to create still more steam which is separated from the brine in atmospheric flash vessel 60. Steam may, as shown in FIG. 1a, be discharged from vessel 60, through a conduit 110, into the atmosphere; alternatively, the steam may be used for facility heating or other heating purposes. Silica crystallization from the brine onto the suspended silicious material continues, to some extent, in atmospheric flash vessel 60.

From vessel 60, brine and the entrained silicious material are discharged, through a conduit 112, into a recirculation-type reactor-clarifier 114 (FIG. 1a) which, with a thickener 116 and a filter press 118, comprises brine clarification and stabilization stage 28. Within reactor-clarifier 114, the suspended silicious material settles from the brine as a sludge which is removed, along with some of the brine, from the bottom of the reactor-clarifier (through a conduit 120). An overflow of clarified brine, which still contains small amounts, for example, about 150 parts per million (PPM), of suspended silicious particles a few microns in size, is discharged from reactor-clarifier 114, through a conduit 122, to a first filter pump 124. Wet, silicious sludge is discharged from reactor-clarifier 114, through conduit 120, to sludge thickener 116, in which much of the brine is removed from the sludge. Partially dewatered sludge is discharged from thickener 116, through a conduit 126, to a sludge pump 128. The comparatively small amount of brine overflow from thickener 116 is discharged, through a conduit 130, to a second filter pump 132. By way of example, for the above-mentioned approximate 1.3 million pounds per hour brine extraction rate, the clarified brine overflow rate from reactor-clarifier 114 may be about 1.1 million pounds per hour and the brine overflow rate from thickener 116 may be about 70,000 pounds per hour.

Sludge pump 128 (FIG. 1a) pumps part of the wet silica sludge (discharged from reactor-clarifier 114 through conduit 126) back upstream, through conduit 102, into high pressure flash crystallizer 57, wherein the sludge functions as seed material. The rest of the sludge is pumped, through a conduit 134, into filter press 118 for dewatering. Valves 136 and 138, in respective conduits 102 and 134, control the division of sludge from sludge pump 128 between flash crystallizer 57 and filter press 118, according to operational requirements. Brine extracted from the sludge in filter press 118 is flowed, through a conduit 140, to a settling basin 141 (FIG. 1b). Dewatered sludge, which still contains some entrapped brine, is discharged from filter press 118 for additional treatment or disposal. For the above-mentioned, exemplary brine flow rate of about 1.3 million pounds per hour, sludge may be discharged from filter press 106 at a rate of about 500 pounds per hour (that is, about six tons per day).

Filter pumps 132 and 124 pump the brine overflow from thickener 116 and reactor-clarifier 114, through respective conduits 144 and 142, into respective first and second media filters 146 and 148 (FIG. 1b). These filters 146 and 148, with a backwash holding tank 150 and a backwash pump 151, principally comprise brine filtering stage 30. From filters 146 and 148, filtered brine is flowed, through respective conduits 152 and 153 and a common conduit 154, to a brine injection pump 156. Filtered brine is pumped by pump 156, through a common conduit 158 and conduits 160 and 162, into first and second injection wells 164 and 166, respectively, which preferably discharge the filtered brine back into into geothermal brine aquifer 42. Pump 156 and injection wells 164 and 166 comprise injection stage 32.

Within filtering stage 30, filtered brine may be diverted from filter discharge conduit 154, through a conduit 170, into backwash holding tank 150. Valves 172 and 174, in respective conduits 154 and 170, control the flow of filtered brine from filters 146 and 148 into injection wells 164 and 166 and/or into backwash holding tank 150. When filters 146 and 148 require backwashing, filtered brine is pumped, by backwash pump 151, through a common conduit 178 and conduits 180 and 182, into and through the filters in a reverse-flow, flushing direction. Backwash brine, containing silicious materials flushed from filters 146 and 148, is discharged from the filters, through conduits 184 and 186 and a common conduit 188, into settling basin 141. Valves 196, 198, 200 and 202, in respective conduits 152, 154, 184 and 186, control brine flow for backwashing purposes. A typical filter backwash for filters constructed to handle a clarified brine flow of about 1.1 million pounds per hour (consistent with the exemplary brine extraction rate of about 1.3 million pounds per hour) may, for example, use about 8500 gallons of brine per filter, per backwash.

From "condensate in" tank 100 (FIG. 1b), the condensate received from power generating facility 14 overflows into a condensate storage vessel or tank 208. An emergency overflow storage pond 210 is located between, and is in in overflow communication with, condensate storage vessel 208 and brine settling basin 141. Brine from settling basin 141 may, as shown, be pumped by a brine pump 212, through conduits 214 and 216, back upstream to atmospheric flash vessel 60 (FIG. 1a) for combining therein with brine from low pressure flash crystallizer 58 for subsequent clarification and filtering with the main flashed brine flow before ultimately being pumped into injection wells 164 and 166.

It is to be understood that exemplary power plant 10 is shown in FIGS. 1a and 1b simplified over an actual power plant, which is understandably complex and has a great many valves, conduits, controls and the like not shown or described herein. For example, a practical operating geothermal brine power plant may be expected to have more than the described and shown two extraction wells 38 and 40, the two separators 48 and 50, the two media filters 146 and 148 and the two injection wells 164 and 166.

SECONDARY BRINE CLARIFICATION

Shown in FIG. 2 is a variation geothermal brine electric power plant 10a which is generally similar to above-described power plant 10, except that, as shown and as is described below, brine filtration and settling stage 30 of power plant 10 is replaced by a secondary brine clarification stage 300, in accordance with the present invention. In power plant 10a of FIG. 2, elements and features which are the same as those above-described for power plant 10 of FIG. 1 have the same reference numbers. Elements and features shown in FIG. 2 which correspond generally to those shown and previously described in relation to FIG. 1 are given the same reference number previously used followed by an "a." New elements and features appearing for the first time in FIG. 2 are given new reference numbers, starting with the reference number 300.

Figure 2A:
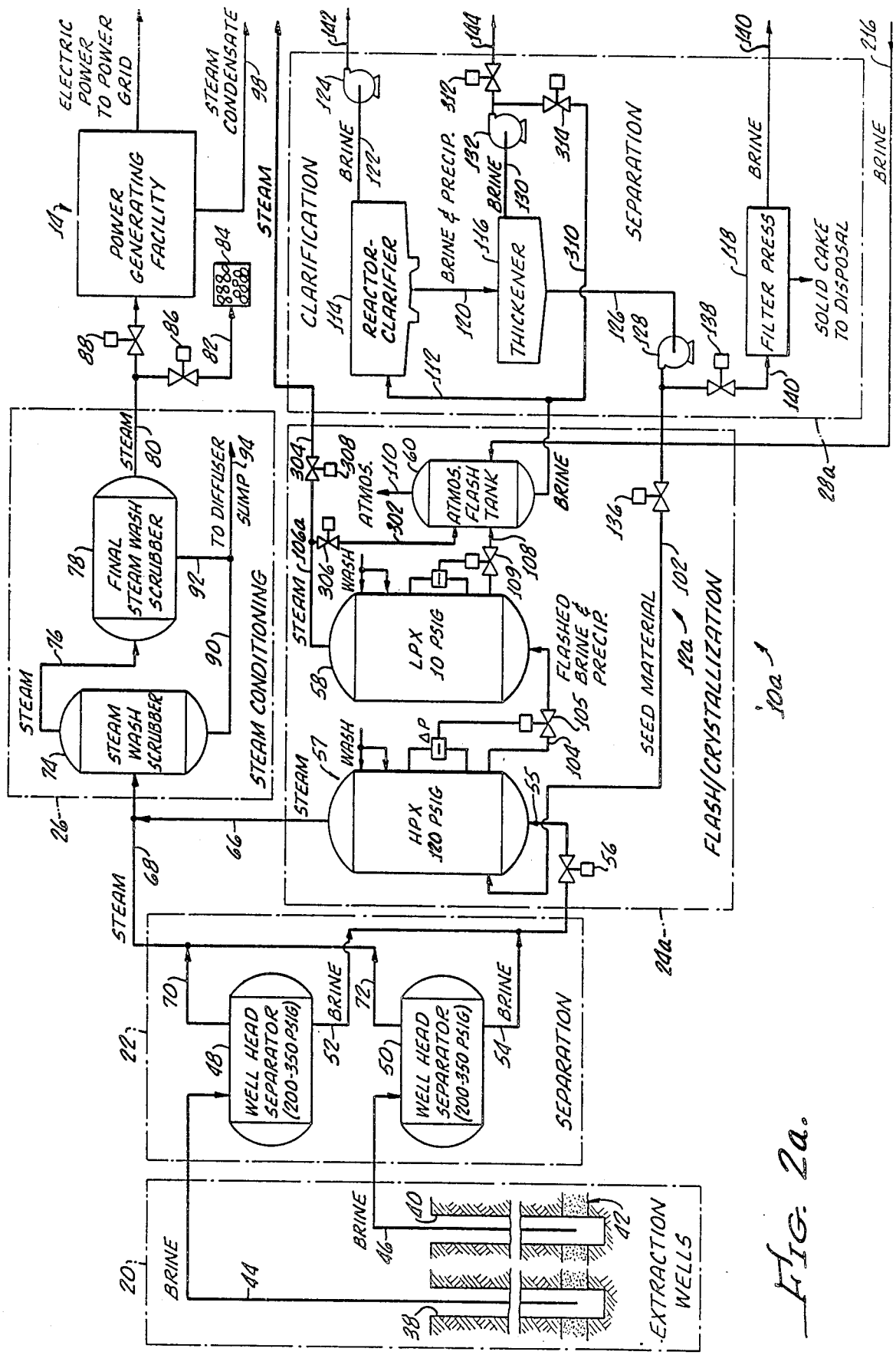
FIG. 2 is a simplified diagram of an exemplary geothermal brine electrical power plant which incorporates a secondary brine clarification stage according to the present invention, FIG. 2a showing one part of the power plant and FIG. 2b showing the remainder of the power plant.
Figure 2B:
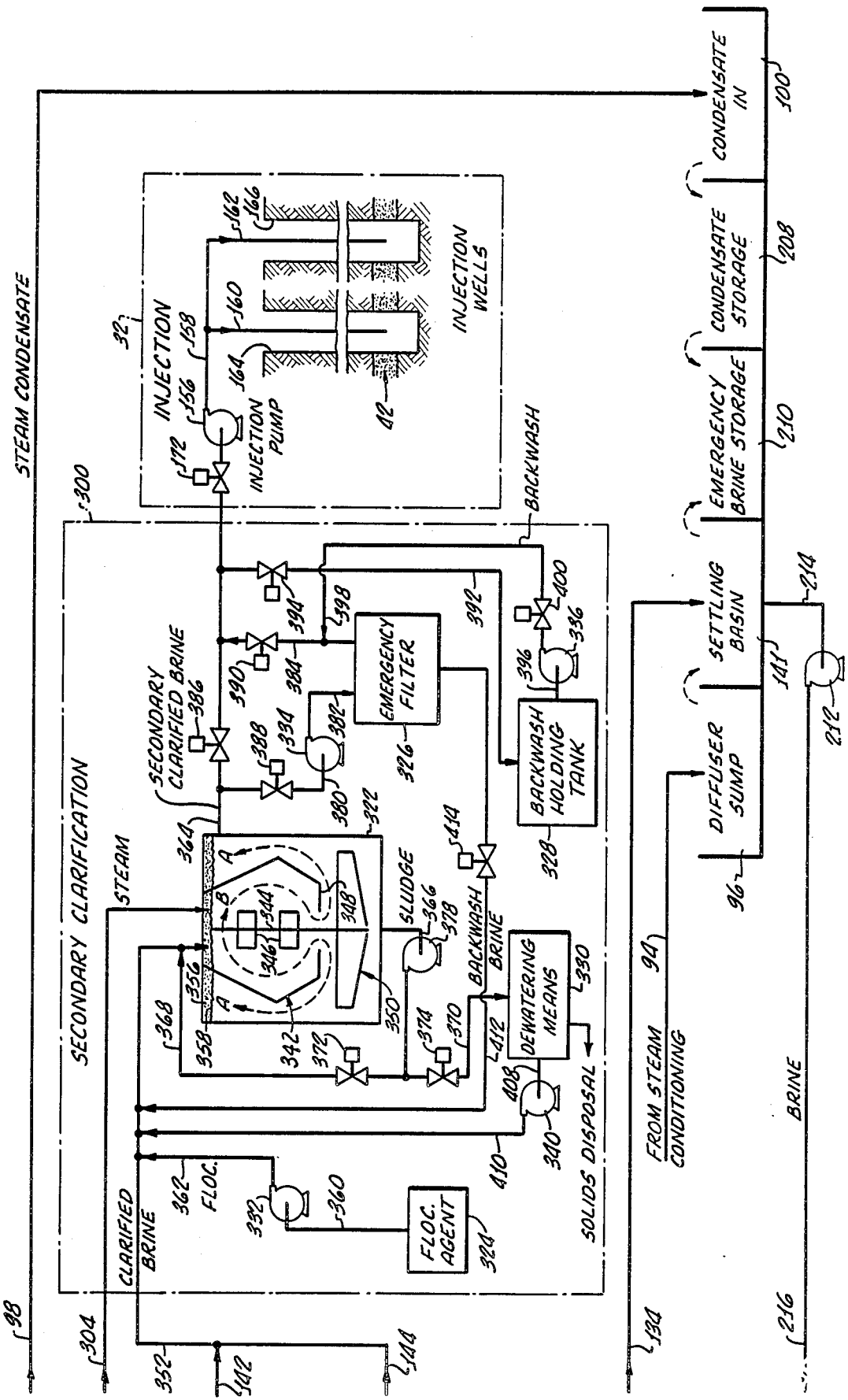

Power plant 10a is shown in FIG. 2 as comprising a brine handling portion 12a and power generating portion 14. Comprising brine handling portion 12a (and shown in FIG. 2a unless otherwise noted) are brine extraction stage 20, wellhead separation stage 22, a flash crystallization stage 24a, steam conditioning stage 26, a brine clarification and separation stage 28a, secondary brine clarification stage 300 (FIG. 2b), and brine injection stage 32 (also FIG. 2b).

The principal difference between flash crystallization stage 24a (FIG. 2a) and above-described flash crystallization stage 24 (FIG. 1a) is that in crystallization stage 24a only a portion, instead of all, of the steam discharged from low pressure flash crystallizer 58 is flowed into atmospheric flash vessel 60. As shown in FIG. 2a, only part of the steam from low pressure flash crystallizer 58 is flowed, through conduits 106a and 302, into atmospheric flash vessel 60, the rest of the steam being diverted, through a conduit 106a and a conduit 304, to secondary clarification stage 300 (FIG. 2b) for purposes described below. Valves 306 and 308 (FIG. 2a), in respective conduits 302 and 304, control the division of steam between atmospheric flash vessel 60 and secondary clarification stage 300.

Brine clarification and separation stage 28a (FIG. 2a) differs from above-described clarification and separation stage 28 (FIG. 1a) in that provisions are preferably included in brine handling system 12a for pumping brine overflow from thickener 116, by pump 132, back upstream, through a conduit 310 (FIG. 2a), to brine inlet conduit 112, through which brine and suspended solids are flowed into reactor-clarifier 114 from atmospheric flash vessel 60. This provision in system 12a for recycling the brine overflow from thickener 116 is desirable in case the amount of suspended solids in the thickener overflow becomes excessive, for example, due to settling problems in reactor-clarifier 114. Ordinarily, however, the brine overflow is pumped from thickener 116, through conduit 144, and is combined with brine from reactor-clarifier overflow conduit 142, which, in turn, discharges (through a conduit 352, FIG. 2b) into secondary clarification stage 300. In this regard, it should be noted that the thickener overflow rate is much smaller than the reactor-clarifier overflow rate. As an illustration, for the above-mentioned, exemplary brine extraction rate of about 1.3 million pounds per hour, the reactor-clarifier overflow rate may be about 1.1 million pounds per hours; whereas, the thickener overflow rate may be only about 70 thousand pounds per hour. Consequently, the thickener overflow into secondary clarification stage 300 from conduit 144 is greatly diluted by the reactorclarifier overflow in conduit 142. The amount of suspended solids in the thickener overflow (although generally comparable with that of the reactor-clarifier overflow, in terms of parts per million) is, therefore, usually not critical. Valves 312 and 314, in respective conduits 144 and 310, enable the diverting of the brine overflow from thickener 116 from secondary clarification stage 300 to reactor-clarifier 114, as required for proper system operation. It will, of course, be readily appreciated that such a provision for thickener overflow recirculation could similarly be provided in above-described clarification and settling stage 28 (FIG. 1a) to protect filtration and settling stage 30.

Generally comprising secondary brine clarification stage 300 (FIG. 2b) are a closed, secondary clarification vessel 322; a flocculating agent tank 324; a relatively small, high-flow rate, emergency filter 326; a filter backwash brine holding tank 328, and sludge dewatering means 330. Also included are respective flocculating agent, filter, backwash, solids recirculating, and dewatering means brine overflow pumps 332, 334, 336, 378, and 340.

Secondary clarifier vessel 322, which may be of a metallurgical reactor type, is formed having a large internal reaction well 342 in which are mounted, on a vertical shaft 344, two (or more) rotatably driven mixing blades 346. Below a partially-open bottom 348 of reaction well 342 are rotatably driven scraper blade means 350. Clarified brine overflow (which may sometimes be called brine effluent) from reactor-clarifier 114 (FIG. 2a) is flowed, through conduits 142 and 352, into upper regions of secondary clarifier reaction well 342 along with thickener overflow from conduit 144, as described above. Steam is flowed from low pressure flash crystallizer 58, through conduit 304, into upper regions of secondary clarifier vessel 322 to provide a steam blanket 356 over a surface 358 of brine in the vessel. Steam blanket 356 in vessel 322 excludes air from the vessel, thereby preventing increased brine acidification which could otherwise be caused by oxidation of ferrous ions naturally present in the brine to ferric ions, as is mentioned above with respect to the ponding of filter backwash brine. Preferably, the steam used to blanket the brine in vessel 322 is obtained (from low pressure flash crystallizer 58) from brine which is subsequently treated in vessel 322, the chemical compatibility of the brine and steam being thereby assured, as is important to prevent possible upsetting of the secondary clarification process.

A flocculating agent, preferably, as more particularly described below, either a cationic, anionic, or non-ionic polyacrylamide (or mixtures thereof) having a high molecular weight, is preferably fed by pump 332 (FIG. 2b), through conduits 360 and 362, from flocculating agent tank 324 into brine effluent conduit 352, which is connected to the top of vessel 322. Within conduit 352, the flocculating agent is inter-mixed with the clarified brine overflows from both reactor-clarifier 114 and thickener 116 before the brine is discharged into secondary clarifier vessel 322.

Within secondary clarifier vessel 322, the inflowing mixture of brine and flocculating agent from conduit 352 is naturally circulated downwardly through reaction well 342 (direction of Arrows A, FIG. 2b), while at the same time mixing blades 346 are rotated (direction of Arrow B). Reaction well 342 and vessel 322 are preferably constructed to provide between about 10 and about 20 minutes of brine residence time in the reaction well, and to provide a total brine residence time in the vessel of between about 45 minutes and about 150 minutes. Such residence times enable effective flocculating of the fine residual solids suspended in the brine and permit the settling out of the flocculated material to the bottom of vessel 322. More preferably, to minimize vessel size, the respective brine residence times in reaction well 342 and vessel 322 are about 10 minutes and about 45 minutes.

The secondary clarified brine overflow is discharged from vessel 322, through an overflow conduit 364, to injection pump 156. Preferably the solids content of the secondary clarified brine overflow is less than about 20 parts per million, with the mean particle size being between about 3 and about 4 microns. Within vessel 322, the settled solids are raked, by means 350, to a solids-brine discharge conduit 366 located at the bottom of the vessel.

For the present, secondary brine clarification process to be economically more attractive then the above-described brine filtering process, good secondary clarification should be achieved by the use of only relatively small amounts of flocculating agent. Preferably, considering the usually-high brine flow rates, less than about two parts per million of flocculating agent in the brine should be needed, with a more preferred range being between about 0.25 to about 2 parts per million, it being still more preferred that no more than about 1.25 parts per million of flocculating agent be needed.

The very low concentration of suspended particles in the brine to be clarified in secondary clarifier vessel 322, as well as the typical small size of the particles involved, (for example, about 150 parts per million of particles having a mean size of about 4 or 5 microns) understandably makes the flocculation of the suspended material very difficult. Surprisingly, however, it has been determined by the present inventors that the addition of relatively large amounts of flocculating agent (even if the use of such amounts of flocculant were economically practical) tends to inhibit—rather than enhance—the flocculating rate of the small particles suspended in the brine within vessel 322. Such inhibiting of the flocculation process when using large amounts of flocculant may possibly result from the mutual repelling of the flocculant ions.

The present inventors have likewise surprisingly determined that increasing the brine-flocculating agent mixing or circulation rate (for example, by the faster rotation of mixer blades 346) tends to reduce, rather than increase, the particulate flocculation rate. This unexpected effect is possibly due to the increased agitation rupturing molecular bonds in the long-chain flocculant molecules.

To provide an economically practical secondary clarification process, the present inventors have discovered the importance of recirculating some of the flocculated solids at a rate which maintains the solids concentration in reaction well 342 within a preferred weight percent range of between about 0.5 and about 3 weight percent. More preferably, the solids concentration in reaction well 342 is maintained at about 1.5 weight percent. This maintaining of the solids concentration in reaction well 342 at a selected weight percent may, as shown in FIG. 2b, be achieved by recirculating some of the flocculated solids and brine underflow from secondary clarifier vessel 322 back upstream to the inlet of the vessel. For such purpose, a pump 378 is connected to discharge conduit 366 for pumping some of the flocculated solids and brine brine underflow from vessel 322, through a conduit 368, to brine inlet conduit 352. The rest of the underflow from vessel 322 is pumped (by pump 378), through a conduit 370, to sludge dewatering means 330. Valves 372 and 374 in respective conduits 368 and 370 control the division of the underflow pumped by pump 378 between brine inlet conduit 352 to vessel 322 and dewatering means 330.

The recirculation of solids to maintain the solids concentration in reaction well 342 at a predetermined level may alternatively (or additionally) be accomplished by the use of a recirculation pump (not shown) installed internally in secondary clarifier vessel 322. By such means, the recirculation of flocculated solids to maintain a particular solids concentration in reaction well 342 is accomplished internally of secondary clarifier vessel 322.

In the event that a system malfunction causes the concentration of residual solids suspended in the brine overflow from secondary clarifier vessel 322 to exceed permissible or desirable reinjection limits, the brine overflow from the vessel may be temporarily diverted from overflow conduit 364, through a conduit 380, to pump 334 which pumps the brine, through a conduit 382, into emergency filter 326. After passing through filter 326, the brine is flowed, through a conduit 384, back into conduit 364 leading to injection pump 156. Valves 386, 388, and 390, in respective conduits 364, 380, and 384, enable the brine overflow from secondary clarifier vessel 322 to be alternatively diverted around or through emergency filter 326, according to system operating requirements. Since it is intended that brine overflow from secondary clarifier vessel 322 be flowed through emergency filter 326 only until normal secondary clarification of the brine is reestablished in vessel 322, the emergency filter is not required to be nearly as extensive as brine filtering stage 30 (described above with respect to brine handling system 12), which secondary clarification stage 300 replaces.

Associated with emergency filter 326 is backwash holding tank 328, to which is flowed, through a conduit 392 connected to brine conduit 364, the brine overflow from vessel 322. Valve 172, installed in conduit 364 downstream of the connection point of conduit 392, and a valve 394, installed in conduit 392, control the diverting of brine by injection pump 156 into backwash holding tank 328. Filter backwashing is accomplished by backwash pump 336 pumping brine from holding tank 328, through conduits 396 and 398 and a control valve 400, to filter outlet conduit 384 upstream of valve 390. Backwash brine from emergency filter 326 is pumped, by pump 336, through a conduit 412 and a control valve 414, back upstream to brine inlet conduit 352 of secondary clarifier vessel 322.(FIG. 2b).

Secondary clarification stage 300 is, importantly, "decoupled" from upstream regions of brine handling portion 12a of power plant 10a—except, of course, to the extent that clarified brine from clarification and separation stage 28ais flowed, downstream, through conduits 142, 144 and 352 into the secondary clarification stage. Because no sludge, brine, nor flocculating agent from secondary clarification stage 300 is circulated back upstream, none of the flocculating agent used in the secondary brine clarification process of the present invention has an opportunity to be carried over into steam produced from the brine, which might cause problems in power generating portion 14. Nor is there any possibility that the flocculating agent can disrupt the upstream silica crystallization process in flash crystallizers 57 and 58 or upset the primary clarification process in reactor-clarifier 114. Moreover, since neither the filter backwash from emergency filter 326 nor the brine overflow from dewatering means 330 are recirculated upstream of secondary clarification stage 300, the fine particles suspended in these brine overflows cannot cause upsets in reactor-clarifier 114, as may occur when backwash from filtering stage 30 and brine overflow from thickener 116 (associated with above-described system 12) are recycled into the reactor-clarifier. This decoupling of secondary clarification stage 300 form upstream portions of brine handling portion 12a is further achieved by pumping the brine overflow from dewatering means 330 (by pump 340), through conduits 408 and 410 back into clarified brine inlet conduit 352, as shown in FIG. 2b, rather than further upstream.

With further respect to the types of flocculating agents which may be used to advantage in the secondary clarification of brine in vessel 322, the present inventors have recently determined that although in some situations cationic polyacrylamide flocculants are generally more effective than anionic or non-ionic polyacrylamide flocculants in flocculating the fine material suspended in the flashed brine, the opposite is true in other situations.

In brine handling portion 12a, described above with respect to secondary brine clarification in stage 300, the present inventors have now determined that anionic polyacrylamide flocculants are generally more effective than cationic polyacrylamide flocculants in flocculating the silicious material suspended in flashed brine than are the previously-disclosed cationic polyacrylamide. As a result of this greater flocculating effectiveness of anionic polyacrylamide flocculants, smaller amounts of flocculant, for example, no more than about 0.75 PPM, have been found sufficient to achieve the same degree of flocculation previously achieved by the use of substantially greater amounts of a cationic polyacrylamide flocculant. The ability to achieve good flocculation with the use of smaller amounts of flocculating agent is obviously important from a flocculant cost standpoint. Moreover, the use of smaller amounts of a flocculating agent results in a reduced chemical change to the brine being treated, as is highly desirable for the prevention or reduction of other brine-handling problems which are sensitive to "impurities" in the brine.

Figure 4:
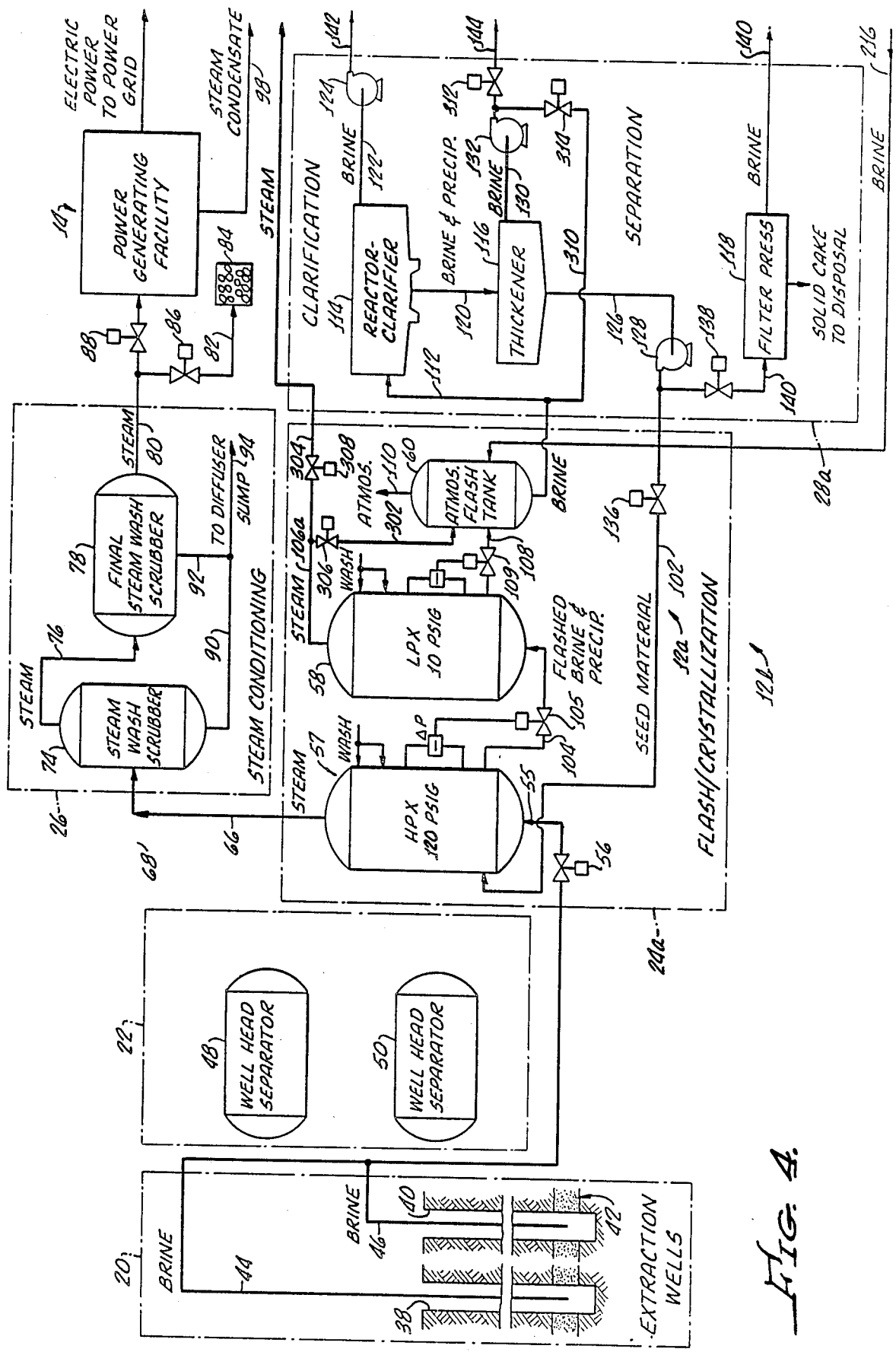
FIG. 4 is a simplified diagram of portions of an exemplary geothermal brine electrical power plant, corresponding to the portion depicted in FIGS 1a and 2a, in which the wellhead separation stage has been eliminated (or bypassed)

Nevertheless, in other configurations of the brine handling portion of the power plant, for example, configurations such as depicted in FIG. 4 in which significant amounts of heavy metal sulfides are contained in the brine, the use of a cationic polyacrylamide flocculant has been found by the present inventors to be more effective than the use of an anionic polyacrylamide flocculant. With regard to such an alternative brine handling portion 12b, shown in FIG. 4, it can be appreciated that in order to handle very large amounts of brine, for example, the approximate 1.3 million pounds per hour needed for even a 10 megawatt power plant, huge vessels and equipment, as well as large diameter pipe, valves and fittings, are required throughout the brine handling facility. Such large vessels, equipment, pipe, valves, and so forth are very costly to buy or construct—especially since the extremely corrosive nature of the brine and its high temperature and pressure as extracted from the ground usually require the use of at least some expensive, corrosion resistant alloys. The maintenance (for example, periodic descaling) of large vessels and the like is costly. In addition, many of the vessels required in the brine handling facility require the use of relative large ground areas, which may be expensive in some localities. Consequently, the elimination of any of the large vessels and associated piping, valves, and so forth (such as the elimination of filters 146 and 148 by the implementation of secondary brine clarification) normally results in substantial initial and long-term cost savings.

Further in this regard, the present inventors have determined that, at least under some circumstances, it is feasible to eliminate (or bypass) wellhead separation stage 22 (shown in phantom lines in FIG. 4) and flow the extracted geothermal brine, through respective conduits 44 and 46, directly from extraction wells 38 and 40 to high pressure flash crystallizer 57. Otherwise, brine handling portion 12b is substantially identical to above-described brine handling portion 12a, and is, therefore, not further described. The obvious advantage offered by brine handling portion 12b is that the large wellhead separators (corresponding to separators 48 and 59, FIGS. 1a and 2a) and associated pipe, valves, fittings, and so forth are eliminated.

A potential disadvantage associated with the elimination of wellhead separation stage 22—in which non-condensible gases, including hydrogen sulfide, are removed from the brine before the brine is flashed—is that heavy metal sulfides tend to "crystallize," along with silica, onto the silica seed material introduced from thickener 116 into high pressure flash crystallizer 57. If the recovery of minerals from the siliceous sludge discharged from brine handling portion 12b is desired, the the removal of heavy metal sulfides with the silica is an important advantage. However, if minerals recovery from the sludge is not of interest, disposal of the heavy metal-containing sludge can be costly if the heavy metal concentrations are sufficiently high to cause the sludge to be classified as a hazardous waste material.

In any event, the elimination of wellhead separation stage 22 will normally cause the solids suspended in the brine, as the brine is flowed into secondary clarification stage 300, to include a substantially higher concentration of heavy metal sulfide particulates than would otherwise be the case. The present inventors have determined, by performing Zeta potential tests on various types brine samples (as described below) that in the presence of such higher concentrations of suspended, heavy metal sulfides, cationic polyacrylamide flocculants are usually more effective in flocculating the suspended solids than are anionic polyacrylamide flocculants.

Further with respect to the secondary clarification of brines containing, and those not containing, substantial concentrations of sulfides, the present inventors have determined (by the use of visual inspection during jar testing) that non-ionic polyacrylamide flocculants typically have flocculating properties intermediate those of cationic and anionic polyacrylamide flocculants. As an example, for sulfide-containing brines in which a cationic polyacrylamide flocculant provides better suspended solids flocculation than does an anionic polyacrylamide flocculant, a non-ionic polyacrylamide flocculant ordinarily performs better than the anionic polyacrylamide flocculant, but not as well as the cationic polyacrylamide flocculant.

The present invention may be further described with reference to the following examples.

EXAMPLE 1

A side stream of clarified geothermal brine is drawn from the main clarified brine flow from a reactor-clarifier (corresponding to reactor-clarifier 114, FIG. 2a). The main flow rate of clarified brine from the reactor-clarifier is about 1.2 million pounds per hour and the side stream flow rate varies between about 25,000 and about 100,000 pounds per hour. Composition of the brine in the side stream is substantially as follows:

sodium—60,000 parts per million (PPM),
potassium—15,000 PPM,
calcium—30,000 PPM,
iron (ferrous)—800 PPM,
manganese—900 PPM, and
silica—350 to 500 PPM.

Temperature of the brine in the side stream is about 225° F., and the brine is at atmospheric pressure. Wellhead separators (corresponding to separators 48 and 50, FIG. 2a) are installed upstream of the reactor clarifier.

The concentration of suspended solids in the clarified brine side stream varies, over time, between about 150 PPM and about 300 PPM, with the average concentration being about 200 PPM. Mean particle size of the particles suspended in the brine side stream about 4-5 microns. The brine side stream is flowed into a secondary clarifier vessel (corresponding generally to vessel 322, FIG. 2b).

The suspended particle concentration in the brine overflow from the secondary clarifier vessel is determined, as is mean particle size, for a number of different conditions described below. Duration of the test is about 50 days.

During an initial period of about 5 days, the side stream of brine is flowed through the secondary clarifier vessel with no addition of flocculants and without any solids-brine underflow from the vessel circulated back into the vessel. During this initial period, the concentration and mean particle size of solid material suspended in the brine overflow from the vessel are determined to be about the same as that of the clarified brine side stream entering the secondary clarifier vessel from the reactor-clarifier.

During a next period of about 14-15 days, the side stream of clarified brine flowing through the secondary clarifier vessel is contacted with a cationic polyacrylamide flocculant (MAGNIFLOD 1303) having a molecular weight of about 16 million, the concentration of the flocculant being varied between about 1.5 PPM and about 3 PPM. The flocculant is diluted with water before introduction into the brine to a concentration of less than about 1 percent to activate the flocculant. During this period, no solids-brine underflow from the secondary clarifier vessel is recirculated back into the vessel. The concentration of solids suspended in the brine overflow from the vessel is determined to be between about 75 PPM and about 250 PPM, the average concentration being determined to be about 175 PPM.

During the last, approximately 28 days of the test, the side stream of brine flowing through the secondary clarifier vessel is contacted with the above-mentioned flocculant in concentrations of between about 0.75 PPM and about 1.25 PPM. Also during this last test period, some of the solids-brine underflow from the secondary clarifier vessel is recirculated back into the vessel at a rate causing the weight percent of solids in the vessel to be between about 1.0 and about 2.0. The concentration of solids suspended in brine overflow from the secondary clarifier vessel is determined to be between about 10 PPM and a peak of about 70 PPM, with the average concentration being between about 20 PPM and about 30 PPM. Mean size of the suspended particles in the brine overflow is determined to be about 4-5 microns.

Figure 3:
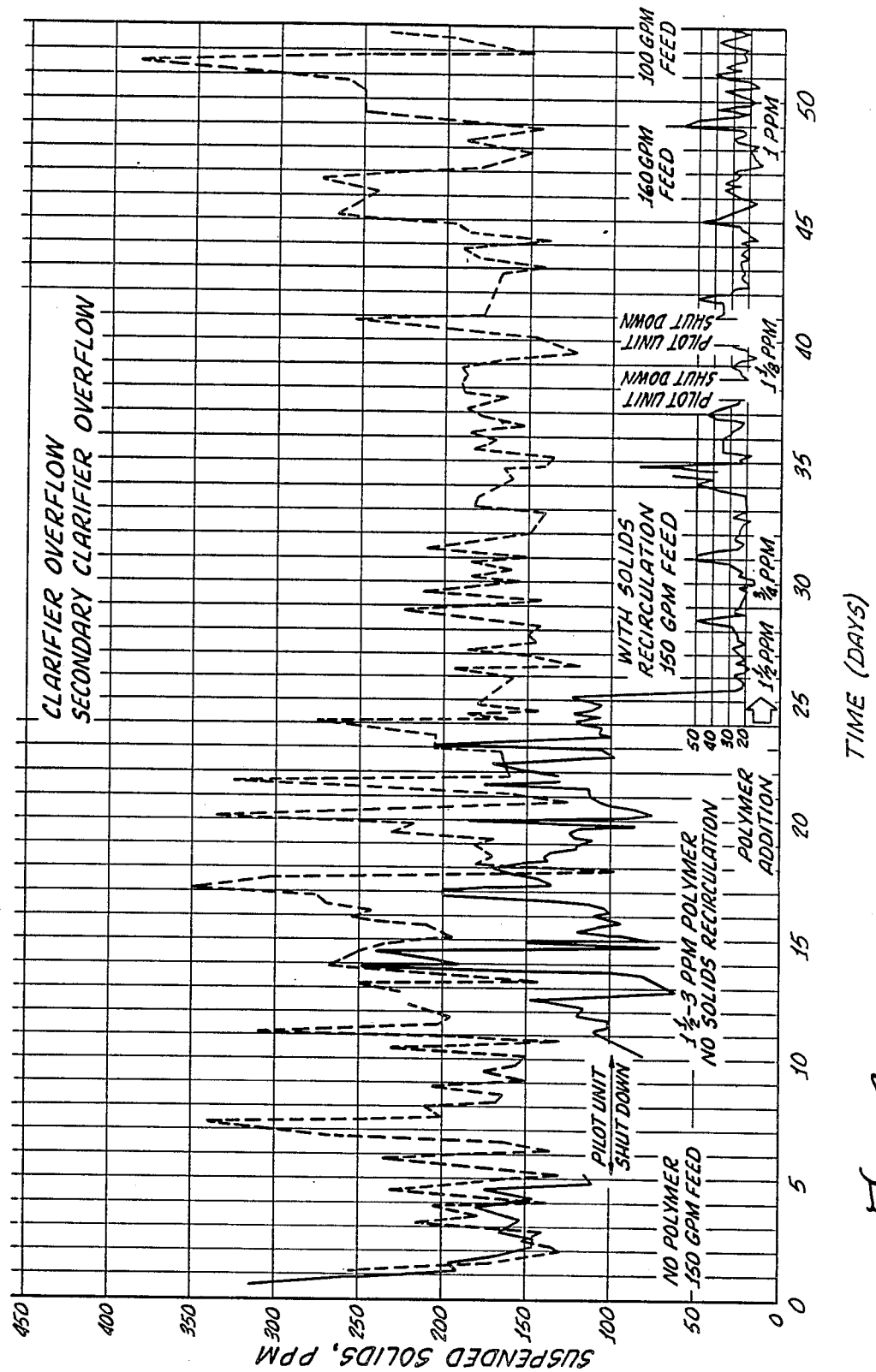
FIG. 3 is a graph in which the residual solids concentration (in parts per million) in geothermal brine is plotted both for clarified brine and for secondarily-clarified brine against time during which various secondary clarification treatments are applied to brine from a primary clarifier, the floculant used in the brine treatment being a cationic polyacrylamide.

The results of the testing, plotted in graph form on FIG. 3, show that during the first 5 days, without the addition of a flocculant, the solids concentration in the brine overflow from the secondary clarifier (solid line) is subatantially the same as the solids concentration in the brine overflow from the primary clarifier (dashed line). From the 10th to the 25th day, with the addition of a flocculant but without solids recirculation, FIG. 3 shows that the solids concentration in the brine overflow from the secondary clarifier is less, but not substantially less, than the solids concentration in the brine overflow from the primary clarifier. After the 25th day of testing, when solids circulation is combined with the addition of a flocculant, the solids content of the brine overflow from the secondary clarifier is substantially reduced (by a factor of over about 5) over the solids concentration in the brine overflow from the primary.

EXAMPLE 2

Flashed geothermal brine is flowed into a reactor-clarifier (corresponding to reactor-clarifier 114, FIG. 2a) at a rate of about 1.3 million pounds per hour. The brine overflow from the reactor-clarifier if flowed into a secondary clarifier vessel (corresponding to secondary clarifier vessel 322, FIG. 2b). The composition of the brine and its temperature and pressure are as given above in Example 1.

The suspended particle concentration in the brine overflow from both the reactor-clarifier and the secondary clarifier vessel is measured, as is the mean particle size, for a number of different conditions described below. Duration of the test is about seven (7) months.

During about the first three months of the testing, an anionic polyacrylamide flocculant (BETZ 1117L), having a molecular weight of about 16 million, is separately added to both the primary clarifier and to the secondary clarifier to determine how the solids concentration in the secondary clarifier overflow is affected under such conditions. The amount of such flocculant added to the primary clarifier is between about 0.5 PPM and about 1.5 PPM, and the amount of such flocculant separately added to the secondary clarifier is between about 0.25 PPM and about 1.0 PPM. The flocculant is diluted with water to a concentration of less than about 1 percent to activate the flocculant. Flocculated solids from the secondary clarifier vessel are recirculated from the vessel back into reaction well regions of the secondary clarifier to provide a solids concentration therein of between about 0.5 to about 2.5 weight percent. The average solids concentration in the reaction well regions is maintained at about 1.1 to 1.2 weight percent.

During this first, approximate three month period, the concentration of solids in the brine from the primary clarifier is between about 50 PPM and about 110 PPM and the solids concentration in the brine from the secondary clarifier is between about 20 PPM and about 60 PPM, except for a single spike of about 100 PPM. The average solids concentration in the brine from the primary clarifier during this period is about 75 PPM and the the average solids content in the brine from the secondary clarifier during this period is about 35 PPM to about 40 PPM During about the next four months of testing, no flocculant is added to the brine in the primary clarifier and about 0.3 PPM of the anionic polyacrylamide flocculant is added to the brine in the secondary clarifier. The solids content in the reaction well regions of the reactor clarifier vessel is maintained at about the same level as during the first, approximate three months of testing by recirculating some of the flocculated solids from the vessel back thereinto. The solids content in the brine from the primary clarifier increases during this test period to between about 80 PPM to about 140 PPM, with the average concentration being about 120 PPM. In contrast, the suspended solids concentration in the brine from the secondary clarifier decreases during this test period to between about 15 PPM to about 40 PPM: the average concentration during the last month of testing (after all the effects of adding flocculant to the primary clarifier during the first three months of testing is worn off) is only about 15 PPM to about 20 PPM. Mean size of the suspended particles in the brine overflow from the secondary clarifier vesses is about 4–5 microns.

Figure 5:
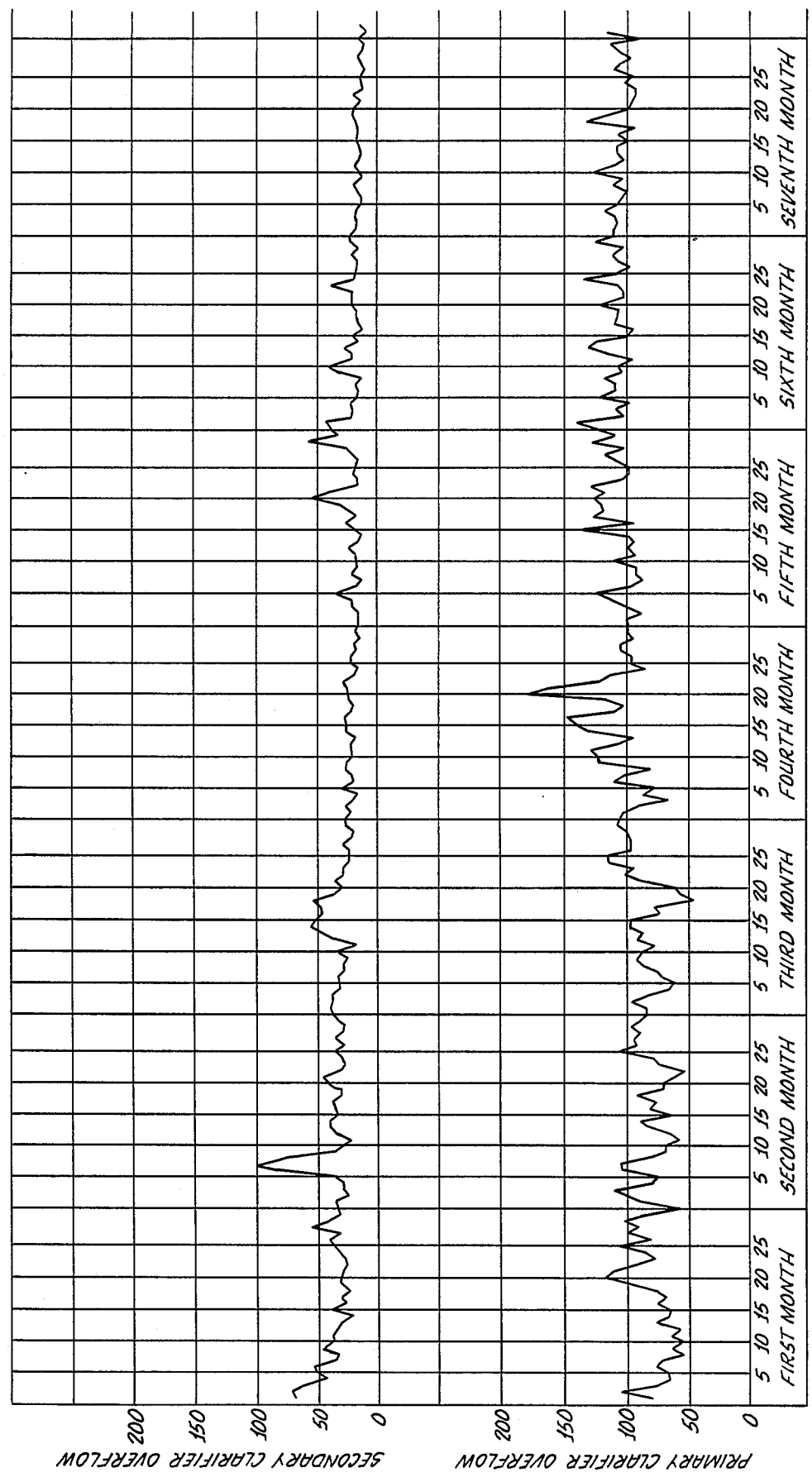
FIG. 5 is a graph in which the residual solids concentration (in parts per million) of secondarily-clarified geothermal brine is plotted for geothermal brine treated with an anionic polyacrylamide flocculant as a function of time during which the flocculant is added.

The results of the testing are plotted in graph form in FIG. 5, which compares the suspended solids concentrations in the brine overflows from the primary and secondary clarifiers. As described above, the solids concentration in the secondary clarifier overflow is higher during the first three months when the anionic flocculant is separately added to both the clarifiers. Toward the last month of testing, when the adverse effects of adding the anionic flocculant to the primary clarifier (as well as to the secondary clarifier) is "worn off," FIG. 5 shows that the solids concentration in the secondary clarifier overflow is reduced to a uniform, low level; whereas, the concentration of the suspended solids in the primary clarifier overflow rises over when the anionic flocculant was added to the primary clarifier.

EXAMPLE 3

Three samples of clarified geothermal brine having suspended solids are taken from a geothermal brine clarifier (corresponding generally to reactor-clarifier 114, FIG. 2a) for the measurement of Zeta potential, which correlate with settling properties of the suspended solids.

Sample No. 1 is taken with wellhead separators (corresponding to wellhead separators 48 and 50, FIG. 2a) in service and with sulfide-laden steam condensate combined with the brine in a low pressure flash crystallizer (corresponding to low pressure flash crystallizer 58, FIG. 2a).

Sample No. 2 is taken with the wellhead separators not in service and with flashing of the brine occurring in the high pressure flash crystallizer (corresponding to high pressure flash crystallizer 57, FIG. 2a).

Sample No. 3 is taken with the wellhead separators in service but without the sulfide-laden condensate combined with the brine.

The composition of the three geothermal brine samples is as shown in Table 1.

TABLE 1

| | SAMPLE | | |
|---|---|---|---|
| | No. 1 | No. 2 | No. 3 |
| S as $S^{2-}$ (PPM) | 5500 | 4400 | less than 50 |

TABLE 1-continued

| | SAMPLE | | |
|---|---|---|---|
| | No. 1 | No. 2 | No. 3 |
| Cu (PPM) | less than 40 | 122 | 31 |
| Pb (PPM) | less than 50 | 82 | less than 50 |
| Zn (PPM) | 142 | 138 | 31 |
| Iron silicate (Wt. %) | 64.29 | 67.80 | 63.42 |
| Fe/Si (Wt. %) | 0.14 | 0.13 | 0.12 |
| Barite (Wt. %) | 22.31 | 18.77 | 18.53 |
| FeO (Wt. %) | 7.22 | 9.16 | 8.00 |
| $SiO_2$ (Wt. %) | 42.37 | 59.36 | 55.43 |
| Particle size (microns) | 9 | 11 | 14 |
| pH | 6 | 6 | 6 |
| Temp. (°C.) | 24 ± 2 | 24 ± 2 | 24 ± 2 |

Each of the three samples is divided into three subsamples, a first subsample of each sample has no flocculant added thereto, a second subsample of each sample added thereto 10 PPM of an anionic polyacrylamide flocculant (BETZ 1117L), and a third subsample of each sample has added thereto 10 PPM of a cationic polyacrylamide flocculant (MAGNIFLOC 1303). The Zeta potential of each of the subsamples is measured in a standard manner. The results of the Zeta potential measurements are as shown in Table 2.

TABLE 2

| | SAMPLE | | |
|---|---|---|---|
| | No. 1 | No. 2 | No. 3 |
| First subsample (no Flocculant) | −18 | −15 | −11 |
| Second subsample (anionic Floc.) | 0 | −14 | −5 |
| Third subsample (cationic Floc.) | −21 | +5 | +27 |

Table 2 indicates that the anionic polyacrylamide flocculant reduces the stability (that is, is effective in flocculating) of the suspended particles in Sample Numbers 1 and 3 and that the cationic polyacrylamide flocculant reduces the stability of the suspended solids in Sample Number 2, thereby indicating that an anionic polyacrylamide flocculant is preferred when the wellhead separators are in service and that a cationic polyacrylamide flocculant is preferred when the wellhead separators ar not used.

Although there has been described above a preferred embodiment of a process for the secondary clarification of geothermal brine in accordance with the present invention for the purpose of illustrating the manner in which the invention may be used to advantage, it will be appreciated that the invention is not limited thereto. Accordingly, any and all process modifications or variations which may occur to those skilled in the art should be considered to be within the scope of the invention as defined in the appended claims.

What is claimed is:

1. A process for reducing the concentration of residual solids suspended in geothermal brine overflow from a primary brine clarification stage in which a mixture of hot, flashed, silica-rich geothermal brine and suspended siliceous material is separated so as to provide a siliceous sludge and said geothermal brine overflow having a residual amount of solids still remaining suspended therein, and ferrous ions, the process comprising:
    (a) flowing the geothermal brine overflow, comprising at most about 300 PPM solids by weight, from said primary brine clarification stage into a secondary clarifier vessel;

(b) blanketing the geothermal brine overflow from the primary brine clarification stage with steam in order to prevent oxidation of ferrous ions in the geothermal brine;

(c) contacting said geothermal brine overflow from the primary brine clarification stage in the secondary clarifier vessel with a flocculating agent so as to cause at least some of the solids suspended in the brine to flocculate;

(d) discharging from the secondary clarifier vessel an underflow of flocculated solids and brine and an overflow;

(e) recirculating at least a portion of said flocculated solids so as to provide a preestablished solids concentration in reaction and flocculating regions of the secondary clarifier vessel in which the flocculating agent and brine are contacted;

(f) discharging from the secondary clarifier vessel a secondarily clarified brine overflow in which the concentration of residual suspended solids is substantially reduced over the concentration of residual solids suspended in the brine overflow from the primary clarification stage: and (g) preventing circulation of the secondary clarifier vessel overflow and the secondary clarifier vessel underflow to the primary brine clarification stage.

2. The process as claimed in claim 1, wherein the secondary clarifier vessel has an internal reaction well, and including introducing the brine overflow from the the primary brine clarification stage into said reaction well and contacting the brine with the flocculating agent in the reaction well.

3. The process as claimed in claim 2, including recirculating an amount of said flocculated solids which provides a solids concentration in said reaction well of between about 0.5 and about 3 weight percent.

4. The process as claimed in claim 3 wherein an amount of the flocculated solids is recirculated to provide a solids concentration of about 1.5 weight percent in the reaction well.

5. The process as claimed in claim 1 wherein the secondary clarifier vessel provides a geothermal brine residence time in the vessel of at least about 45 minutes.

6. The process as claimed in claim 5 wherein the vessel provides a brine residence time of between about 45 and about 150 minutes.

7. The process as claimed in claim 1 wherein the step of contacting the geothermal brine overflow from the primary brine clarification stage with a flocculating agent includes adding an amount of flocculating agent to the brine of between about 0.25 and about 2 parts per million.

8. The process as claimed in claim 7 wherein the amount of flocculating agent added to the brine overflow is between about 0.75 and about 1.25 parts per million.

9. The process as claimed in claim 1 including adding the flocculating agent to the brine overflow from the primary brine clarification stage before said brine overflow is introduced into the secondary clarifier vessel.

10. The process as claimed in claim 1 wherein the flocculating agent comprises a cationic polyacrylamide.

11. The process as claimed in claim 10 wherein the flocculating agent has a molecular weight of at least about one million.

12. The process as claimed in claim 11 wherein the molecular weight is at least about 16 million.

13. A process for reducing the concentration of fine, residual, siliceous particles suspended in geothermal brine overflow from a primary brine clarification stage in which hot, flashed, silica-rich geothermal brine having siliceous matter suspended therein is clarified to provide said geothermal brine overflow having a residual amount of fine siliceous particles still remaining suspended therein, and ferrous ions, the process comprising:

(a) flowing into a reaction well of a secondary clarifier vessel said geothermal brine overflow from the primary brine clarification stage, said geothermal brine overflow comprising at most about 300 PPM solids by weight;

(b) blanketing the geothermal brine overflow in the secondary clarifier vessel with steam in order to prevent oxidation of ferrous ions in the geothermal brine;

(c) contacting, within said reaction well, the geothermal brine from the primary clarification stage with between about 0.25 and about 2 parts per million of a flocculating agent so as to cause at least some of the solids suspended in the brine to flocculate;

(d) discharging from the secondary clarifier vessel an underflow slurry of flocculated solids and brine;

(e) recirculating an amount of said flocculated solids in said secondary clarifier reaction well causing the weight percent of solids in the reaction well to be between about 0.5 and about 3;

(f) discharging from the secondary clarifier vessel a secondarily clarified brine overflow having a suspended residual siliceous particle concentration which is substantially reduced over the suspended siliceous particle concentration in the brine overflow from the primary brine clarification stage; and (g) preventing circulation of the secondarily clarified brine overflow and the secondary clarifier vessel underflow slurry to the primary brine clarification stage.

14. The process as claimed in claim 15 wherein the steam blanketing step comprises flowing into the secondary clarifier vessel steam obtained from a flashing of geothermal brine.

15. The process as claimed in claim 13 wherein the brine overflow from the primary brine clarification stage is contacted with between about 0.75 and about 1.25 parts per million of flocculating agent.

16. The process as claimed in claim 13 wherein the flocculating agent is combined with the brine overflow from the primary brine clarification stage before said brine overflow is received into said reaction well.

17. The process as claimed in claim 13 wherein an amount of said flocculated solids is recirculated in the reaction well causing the weight percent of solids in the reaction well to be about 1.5.

18. The process as claimed in claim 13 wherein the concentration of residual siliceous particles suspended in the brine overflow from the primary brine clarification stage is between about 100 and about 300 parts per million and wherein the concentration of residual siliceous particles suspended in the secondarily clarified brine overflow is between about 5 and about 50 parts per million.

19. The process as claimed in claim 13 wherein the flocculating agent comprises a cationic polyacrylamide having a molecular weight of at least about 1 million.

20. The process as claimed in claim 13 wherein the secondary clarifier vessel is constructed to provide a brine residence time of between about 45 and about 150 minutes therein.

21. A process for reducing the concentration of fine, residual, siliceous particles suspended in geothermal brine overflow from a primary brine clarification stage in which hot, flashed geothermal brine having siliceous matter suspended therein is clarified to provide said geothermal brine overflow having a residual amount of fine, siliceous particles still remaining suspended therein, and ferrous ions, the process comprising:

(a) flowing into a reaction well of a secondary clarifier vessel said geothermal brine overflow from the primary brine clarification stage, said geothermal brine overflow from the primary clarification stage comprising at most about 300 PPM solids by weight, said vessel providing a brine residence time therein of between about 45 and about 150 minutes;

(b) blanketing the brine in the secondary clarifier vessel with steam obtained from a flashing of geothermal brine in order to prevent oxidation of ferrous ions in the geothermal brine;

(c) contacting, within the reaction well, the geothermal brine overflow from the primary brine clarification stage with between about 0.25 and about 2 parts per million of a flocculating agent having a molecular weight of at least about one million so as to cause at least some of the solids suspended in the brine to flocculate;

(d) recirculating an amount of the flocculated solids in the reaction well causing the solids concentration therein to be between about 0.5 and about 3 weight percent;

(e) discharging from the secondary clarifier vessel an underflow slurry of flocculated solids and brine and a brine overflow having a residual suspended siliceous particle concentration which is substantially reduced over the residual siliceous particle concentration in the brine overflow from the primary brine clarification stage; and secondary clarified brine overflow and underflow slurry to the primary brine clarification stage.

22. The process as claimed in claim 21 wherein the flocculating agent comprises a cationic polyacrylamide.

23. The process as claimed in claim 21 wherein the reaction well provides a brine residence time therein of between about 10 and about 20 minutes.

24. In combination with a system for production of steam from a geothermal brine, which includes extraction wells, well head separators, flash/crystallization stages, and a primary brine clarification stage, an apparatus for reducing the concentration of residual solids suspended in geothermal brine overflow from the primary brine clarification stage in which a mixture of hot, flashed, silica-rich geothermal brine and suspended siliceous material is separated so as to provide a siliceous sludge and said geothermal brine overflow having a residual amount of solids still remaining suspended therein and having ferrous ions, the apparatus comprising:

(a) a secondary clarifier vessel;

(b) means for flowing the geothermal brine overflow from said primary brine clarification stage into said secondary clarifier vessel;

(c) means for blanketing the geothermal brine in said secondary clarifier vessel with steam so as to prevent oxidation of ferrous ions in the geothermal brine;

(d) means for introducing a flocculating agent into said secondary clarifier vessel so that the flocculating agent contacts the geothermal brine therein and causes at least some of the solids suspended in the brine to flocculate;

(e) means for discharging from the secondary clarifier vessel an underflow of flocculated solids and brine;

(f) means for recirculating at least some of the flocculated solids so as to substantially increase the solids concentration in said secondary clarifier vessel; and (g) means for discharging from the secondary clarifier vessel a secondarily clarified brine overflow;

said means for discharging the underflow of flocculated solids and the overflow of secondarily clarified brine from the secondary clarifier vessel being configured so that substantially none of said underflow and overflow are circulated upstream up to or beyond the primary clarification stage.

25. The apparatus as claimed in claim 24 wherein the secondary clarifier vessel has an internal reaction well, and wherein the means for introducing the brine overflow from the the primary brine clarification stage into the secondary clarifier is configured for introducing said primary clarification stage overflow into said reaction well.

26. The apparatus as claimed in claim 25 wherein the means for combining at least some of the underflow of flocculated solids and brine underflow from the secondary clarifier vessel with the brine overflow from the primary brine clarification stage is configured for providing a solids concentration in said reaction well of between about 0.5 and about 3 weight percent.

27. The apparatus as claimed in claim 25 wherein the means for recirculation at least some of the flocculated solids are configured for providing a solids concentration in said reaction well of about 1.5 weight percent.

28. The apparatus as claimed in claim 24
secondary clarifier vessel is configured for providing a geothermal brine residence time in the vessel of at least about 45 minutes.

29. The apparatus as claimed in claim 24 wherein the secondary clarifier vessel is configured for providing a geothermal brine residence time in the vessel of between about 45 and about 150 minutes.

* * * * *

UNITED STATES PATENT AND TRADEMARK OFFICE
CERTIFICATE OF CORRECTION

PATENT NO. : 4,874,529

DATED : October 17, 1989

INVENTOR(S) : John L. Featherstone, S. Timothy Spang, David G. Newell, and Darrell L. Gallup It is certified that error appears in the above-identified patent and that said Letters Patent is hereby corrected as shown below:

Column 23, line 41, after "and" and before "secondary" insert a new paragraph beginning --(f) preventing circulation of the--.

Column 24, line 50, after "24" insert --wherein the--.

Signed and Sealed this

Sixteenth Day of October, 1990

Attest:

HARRY F. MANBECK, JR.

*Attesting Officer*   Commissioner of Patents and Trademarks